(12) United States Patent
Karr et al.

(10) Patent No.: US 6,850,523 B1
(45) Date of Patent: Feb. 1, 2005

(54) INTERFACE BETWEEN A LINK LAYER DEVICE AND ONE OR MORE PHYSICAL LAYER DEVICES

(75) Inventors: Travis James Karr, Port Moody (CA); Martin Chalifoux, Montreal (CA)

(73) Assignee: PMC-Sierra, Inc., Burnaby ( * ) Notice: Subject to any disclaimer, the term of this patent is extended or adjusted under 35 U.S.C. 154(b) by 0 days.

(21) Appl. No.: 09/313,267

(22) Filed: May 18, 1999

(51) Int. Cl.[7] .............................................. H04L 12/56
(52) U.S. Cl. .................. 370/395.21; 370/389; 370/422
(58) Field of Search ................................ 370/465, 430, 370/472, 469, 395, 351, 395.21, 389, 419, 422, 423, 428, 429

(56) References Cited

U.S. PATENT DOCUMENTS

| | | | | |
|---|---|---|---|---|
| 5,159,447 A | * | 10/1992 | Haskell et al. ......... | 375/240.05 |
| 5,335,325 A | * | 8/1994 | Frank et al. ............. | 395/200 |
| 5,668,810 A | * | 9/1997 | Cannella, Jr. ........... | 370/392 |
| 5,835,782 A | * | 11/1998 | Lin et al. ............... | 395/800.42 |
| 5,854,840 A | * | 12/1998 | Cannella, Jr. .......... | 380/9 |
| 6,147,997 A | * | 11/2000 | Holden et al. ........... | 370/395 |
| 6,157,967 A | * | 12/2000 | Horst et al. ............ | 710/19 |
| 6,307,858 B1 | * | 10/2001 | Mizukoshi et al. ..... | 370/395.71 |

* cited by examiner

Primary Examiner—Wellington Chin
Assistant Examiner—Raj Jain
(74) Attorney, Agent, or Firm—Vermette & Co.; Clifford W. Vermette

(57) ABSTRACT

A bus interface for exchanging packets within a communication system between a single data link layer and a physical layer device which includes a link transmit interface on the link layer device, a PHY transmit interface on the physical layer devices electrically coupled to the link transmit interface, a link receive interface on the link layer device and a PHY receive interface on said physical layer device electrically coupled to the link receive interface, wherein data is transmitted from the link transmit interface to the PHY transmit interface and from the PHY receive interface to the link receive interface in packets of variable length in a word based format wherein each word has at least 1 byte.

17 Claims, 11 Drawing Sheets

|  | Bit 15 | Bit 8 | Bit 7 | Bit 0 |
|---|---|---|---|---|
| Word 1 | Byte 1 | | Byte 2 | |
| Word 2 | Byte 3 | | Byte 4 | |
| ⋮ | ⋮ | | ⋮ | |
| Word 7 | Byte 13 | | Byte 14 | |
| Word 8 | Byte 15 | | Byte 16 | |

*FIG. 4*

INTERFACE BETWEEN A LINK LAYER DEVICE AND ONE OR MORE PHYSICAL LAYER DEVICES

FIELD

The present invention relates to a bus interface for exchanging variable length packets within a communication system.

BACKGROUND

Data is transferred between constituent component devices in data networking equipment in accordance with established standards. In ATM cell transfer between one or more physical layer devices and an ATM layer device (link layer device) is effected using the existing standards known as Utopia level 1 and Utopia level 2. Utopia level 1 was designed for data transfer between one physical layer device and a link layer device. Utopia level 2 is an extension of Utopia level 1 that supports multiple physical layer devices. Sci Phy is a proprietary interface developed by PMC-Sierra Ltd. that is similar to Utopia level 2.

All of the foregoing interfaces are based upon the transfer of fixed-length packets normally referred to as cells. The signals and data formats were not designed to handle variable length packets between the data-link layer device and the physical layer device. At the present time there is no known interface in an ATM environment that will handle variable length packets.

Accordingly, it is an object of the invention to provide an interface that will accommodate the transfer of variable length packets.

SUMMARY OF THE INVENTION

According to the invention there is provided a bus interface for exchanging packets within a communication system between a single data link layer and a physical layer device. The physical layer device has a PHY transmit interface which, in turn, has a PHY transmit FIFO. The link layer device has a link transmit interface electrically coupled to the PHY transmit interface, the link transmit interface being operative to transmit packets of variable length to the PHY transmit interface. The PHY transmit interface has a byte availability indicator operative to indicate to the link transmit interface when the PHY transmit FIFO has a pre-established minimum number of bytes available for data to be written into. The physical layer device has a PHY receive interface while the link layer device has a link receive interface electrically coupled to the PHY receive interface and a byte validity indicator on the PHY receive interface is operative to indicate to the link receive interface the cessation of transmission of valid data from the PHY receive interface.

Preferably, the link transmit interface transmits a Transmit Start of Packet (TSOP) signal to said PHY transmit interface to indicate a first word of a packet transfer from link transmit interface to the PHY transmit interface and the PHY receive interface transmits a Receive Start of Packet (RSOP) signal to the link receive interface to indicate a first word of a packet transfer from the PHY receive interface to the link receive interface.

The PHY transmit interface may transmit to the link layer transmit interface, in response to an address of the physical layer device being polled, a Polled-PHY Transmit Available (PTPA) signal to indicate whether or not a polled PHY transmit FIFO is full. The PHY transmit interface may transmit to the link layer transmit interface a Selected-PHY Transmit Available (STPA) signal to indicate whether or not a selected PHY transmit FIFO is full. The PHY receive interface may transmit to the link layer receive interface, in response to an address of the PHY layer device being polled, a Receive Polled multi-PHY packet Available (PRPA) signal to indicate when data is available in the polled PHY receive FIFO.

Advantageously, a byte validity indicator is a Receive Data Valid (RVAL) signal transmitted by the PHY receive interface to the link layer receive interface to align data transfers with packet boundaries and to indicate a PHY Receive Interface FIFO empty condition.

The byte availability indicator may be a Selected-PHY Transmit Packet Available (STPA) signal transmitted from the PHY transmit interface to the link transmit interface to indicate whether or not the transmit FIFO is not full.

Data transfer may be reversibly convertible from a packet level mode to a byte level mode.

Rather than a single physical layer device there may be a plurality of such devices.

In another aspect of the invention there is provided a method of exchanging variable length packets across a bus interface of a communication system between a single data link layer device having a link transmit interface and a link receive interface and a physical layer device having a PHY transmit interface pith a PHY transmit FIFO, and a PHY receive interface with a PHY receive FIFO. The method involves (a) transmitting a Transmit Start of Packet (TSOP) signal from the link layer device to the physical layer device to indicate a first word of a packet to be transferred from the link layer device to the physical layer device, (b) indicating to the link transmit interface when the PHY transmit FIFO has a pre-established minimum number of bytes available for data to be written into, (c) transmitting a Transmit End of Packet (TEOP) signal from the link layer device to the physical layer device to indicate an end of a packet being transferred from the link layer device to the physical layer device, (d) transmitting a Receive Start of Packet (RSOP) signal from the physical layer device to the link layer device to indicate a first word of a packet being transferred from the physical layer device to the link layer device, (e) indicating cessation of transmission of valid data from the PHY receive interface to the link receive interface, and (f) transmitting a Receive End of Packet (REOP) signal from the physical layer device to the link layer device to indicate the end of a packet being transferred from the physical layer device to the link layer device.

Advantageously, step (e) includes transmitting a Receive Data Valid (RVAL) signal from the physical layer device to the link layer device to align data transfers with packet boundaries and to indicate a PHY Receive Interface FIFO empty condition.

Step (b) may include transmitting a Selected-PHY transmit Packet Available (STPA) signal to indicate whether or not a selected transmit FIFO is not full.

BRIEF DESCRIPTION OF THE DRAWINGS

Further features and advantages will be apparent from the following detailed description, given by way of example, of a preferred embodiment taken in conjunction with the accompanying drawings, wherein:

FIG. 4 is a schematic diagram showing the data structure for a packet;

DETAILED DESCRIPTION WITH REFERENCE TO THE DRAWINGS

Figure 1:
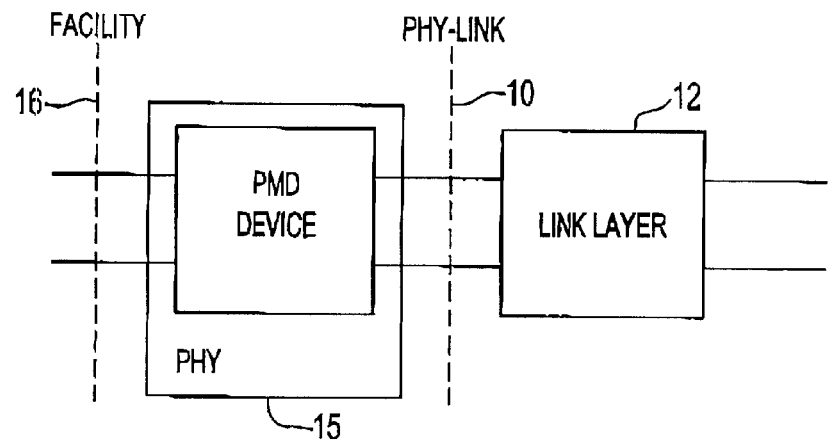
FIG. 1 is a schematic diagram showing an interface between a physical layer device and a link layer device.

Referring to FIG. 1, an interface 10 between a link layer device 12 and a physical layer device 15 provides for exchanging packets between the link layer device 12 and a physical layer device 15. This interface 10 will be termed a POS-PHY packet interface 10. Also shown is a facility interface 16 which is the physical transmission vehicle to the physical layer device 15. Typically, for synchronous optical network (SONET) the facility would be optical fiber, twisted pair electrical or coaxial cable electrical transmission facility. In the following description, the interface where data flows from the link layer device 12 to the physical layer device 15 is termed the transmit interface 18 and the interface where data flows from the physical layer device to the link layer device is termed the receive interface 20 (see FIG. 2).

The POS-PHY interface 10 defines both byte-level and packet-level transfer. In byte level transfer, direct status indication must be used in which every physical layer device 15 provides a separate RPA/TPA status (receive packet available/transmit packet available). The signal acronyms are more completely defined in table 1. The link layer device 12 must process all the incoming RPA/TPA and select the physical layer devices accordingly using the transmit and receive address signals (TADR[4:0] and RADR[4:0]). With packet level transfer, the link layer device 12 uses the physical layer device address busses to poll individual physical layer devices 15, which all respond onto a common polled PRPA/PTPA signal (polled receive multi-physical layer device packet available/polled physical layer transmit packet available). The physical layer device 15 selection for the actual data transfer is performed when TENB and RENB are deasserted. Polling is still active when no physical layer device 15 is selected. Since the variable size of packets does not allow any guarantee as to the number of bytes available, in both transmit and receive directions, a separate selected physical layer device 15 transmit packet available is provided on signal STPA and a receive data valid on signal RVAL. STPA and RVAL always reflect the status of the selected physical layer device 15 to or from which data is being transferred. RVAL indicates if valid data is available on the receive data bus and is defined such that data transfers can be aligned with packet boundaries.

POS-PHY compatible devices support a 16-bit data bus width and accommodate packets with an even or odd number of bytes. Signals RMOD/TMOD are defined and allow a single byte word transfer but only during the last word of a packet transfer.

PHY layer devices must employ FIFO's to decouple from the line bit rate as they must support transmit and receive data transfers at clock rates independent of the line bit rate. FIFO's also allow the support of multiple PHY layer devices. Control signals are provided to both the link layer device 12 and the physical layer device 15 to allow either one to exercise flow control.

When the number of physical layer devices is limited, byte-level transfer provides a simpler implementation at a reasonable pin cost. For a large number of physical layer devices, packet-level transfer provides a lower pin count at the expense of a more complex protocol.

Figure 2:
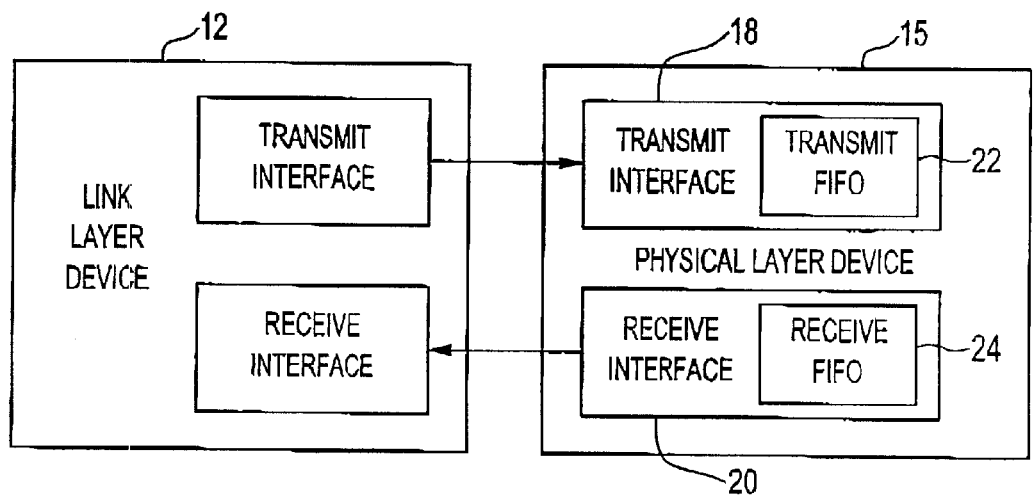
FIG. 2 is a schematic diagram showing transmit and receive interfaces and FIFO's for the a link layer device and a physical layer device.

An example of how several multiple-physical layer devices 15 can be interfaced to a link layer device 12 which uses direct status indication using the DRPA[x]/DTPA[x] signals is seen in FIG. 2. Optionally, the link layer device can perform multiplexed status polling using the PRPA and PTPA signals. In all cases, the address signals are used to perform physical layer device 15 selection. In the example of FIG. 2, the link layer device 12 is connected to a single package four channel physical layer device termed a "Quad PHY layer device".

Referring to FIG. 2 packets are written into the transmit FIFO 22 and read from the receive FIFO 24 using one defined data structure. Octets are written in the same order in which they are to be transmitted or in which they were received on the SONET line. Within an octet, the most significant bit (MSB), being bit 7, is the first bit to be transmitted. All words are composed of two octets, except the last word of a packet transfer which can have one or two bytes. The POS-PHY specification does not preclude the transfer of 1-byte and 2-byte packets. In this case both start of packet and end of packet signals shall be asserted simultaneously.

The POS-PHY interface specification does not define the usage of any packet data. In particular, the POS-PHY interface does not define any field of error correction. If, however, the link layer device 12 uses the PPP protocol, a frame check sequence (FCS) must be processed. If the physical layer device 15 does not insert the FCS field before transmission, these bytes should be included at the end of the packet. If the physical layer device 15 does not strip the FCS field in the receive direction, these bytes will be included at the end of the packet.

Table 1 lists the transmit side POS-PHY interface specification signals. All signals are updated and sampled using the rising edge of the transmit FIFO clock, TFCLK. A fully compatible POS-PHY interface physical layer device 15 requires at least a 256 byte deep FIFO.

TABLE 1

| SIGNAL | DIRECTION | DESCRIPTION |
|---|---|---|
| TDAT[15:0] | LINK to PHY | Transmit Packet Data Bus (TDAT[15:0]) bus. This bus carries the packet octets that are written to the selected transmit FIFO. TDAT[15:0] is considered valid only when TENB is simultaneously asserted. Data must be transmitted in big endian order. Given the previously defined data structure, bits are transmitted in the following order: 15, 14 . . . 8, 7, 6 . . . 1, 0. |
| TPRTY | LINK to PHY | Transmit bus parity (TPRTY) signal. The transmit parity (TPRTY) signal indicates the parity calculated over the whole TDAT[15:0] bus. When TPRTY is supported, the PHY layer device is required to support both even and odd parity. The PHY layer device is required to report any parity error to higher layers but shall not interfere with the transferred data. TPRTY is considered valid only when TENB is asserted. |
| TMOD | LINK to PHY | The Transmit Word Modulo (TMOD) signal. TMOD indicates the size of the current word. TMOD should always be low, except during the last word transfer of a packet, at the same time TEOP is asserted. During a packet transfer every word must be complete except the last word which can be composed of 1 or 2 bytes. TMOD set high indicates a 1-byte word (present on MSB's, LSB's are discarded), while TMOD set low indicates a 2-byte word. |
| TSOP | LINK to PHY | Transmit Start of Packet (TSOP) signal. TSOP indicates the first word of a packet. TSOP is required to be present at the beginning of every packet and is considered valid only when TENB is asserted. |
| TEOP | LINK to PHY | The active high Transmit End of Packet (TEOP) signal. TEOP marks the end of a packet on the TDAT[15:0] bus. When TEOP is high, the last word of the packet is present on the TDAT[15:0] stream and TMOD indicates how many bytes this last word is composed of. It is legal to set TSOP high at the same time TEOP is high. This provides support for one or two bytes packets, as indicated by the value of TMOD. |
| TERR | LINK to PHY | The transmit error indicator (TERR) signal. TERR is used to indicate that the current packet is aborted and should be discarded. TERR should only be asserted during the last word transfer of a packet. |
| TENB | LINK to PHY | Transmit Multi-PHY Write Enable (TENB) signal. The TENB signal is an active low input which is used along with the TADR[4:0] inputs to initiate writes to the transmit FIFOs. POS-PHY supports both byte-level and packet-level transfer. Packet-level transfer operates with a selection phase when TENB is deasserted and a transfer phase when TENB is asserted. While TENB is asserted, TADR[4:0] is used for polling TPA. Byte level transfer works on a cycle basis. When TENB is asserted data is transferred to the selected PHY. Nothing happens when TENB is deasserted. Polling is not available in byte level transfer mode and direct packet availability is provided by DTPA [x]. |
| TADR[4:0] | LINK to PHY | Transmit PHY Address (TADR[4:0]) bus. The TADR[4:0] bus is used to select the FIFO (and hence port) that is written to using the TENB signal, and the FIFO's whose packet available signal is visible on the TPA output when polling. Note that address 0x1F is the null-PHY address and shall not be identified to any port on the POS-PHY bus. |
| STPA | PHY to LINK Packet Level Mode Only. | Selected-PHY Transmit Packet Available (STPA) signal. STPA transitions high when a predefined (normally user programmable) minimum number of bytes is available in the selected transmit FIFO (the one data is written into). Once high, STPA indicates that the transmit FIFO is not full. When STPA transitions low, it optionally indicates that the transmit FIFO is full or near full (normally user programmable). STPA always provide status indication for the selected PHY in order to avoid FIFO overflows while polling is performed. The PHY Layer device shall tristate STPA when TENB is deasserted. STPA shall also be tristated when either the null-PHY address (0x1F) or an address not matching the PHY layer device address is presented on the TADR[4:0] signals when TENB is sampled high (has been deasserted during the previous clock cycle). STPA is mandatory only if packet-level transfer mode is supported. It shall not be driven in byte-level mode, if available, since the protocol would not prevent bus contention. |
| PTPA | PHY to LINK Packet Level Mode Only. | Polled-PHY Transmit Packet Available (PTPA) signal. PTPA transitions high when a predefined (normally user programmable) minimum number of bytes is available in the polled transmit FIFO. Once high, PTPA indicates that the transmit FIFO is not full. When PTPA transitions low, it optionally indicates that the transmit FIFO is full or near full (normally user programmable). PTPA allows to poll the PHY address selected by TADR[4:0] when TENB is asserted. PTPA is driven by a PHY layer |

TABLE 1-continued

| SIGNAL | DIRECTION | DESCRIPTION |
|---|---|---|
| | | device when its address is polled on TADR[4:0]. A PHY layer device shall tristate PTPA when either the null-PHY address (0x1F) or an address not matching available PHY Layer devices is provided on TADR[4:0]. PTPA is mandatory only if packet-level transfer mode is supported. It shall not be driven in byte-level mode, if available, since the protocol would then not prevent bus contention. |
| DTPA[x] | PHY to LINK Byte Level Mode Only. | Direct Transmit Packet Available (DTPA[x]). The DTPA[x] signals provide direct status indication for the corresponding port (referred to by the index "x"). DTPA[x] transitions high when a predefined (normally user programmable) minimum number of bytes is available in the transmit FIFO. Once high, DTPA[x] indicates that the transmit FIFO is not full. When DTPA[x] transitions low, it optionally indicates that the transmit FIFO is full or near full (normally user programmable). DTPA[x] is mandatory only if byte-level transfer mode is supported. It is optional in packet-level mode. |
| TFCLK | LINK to PHY | Transmit FIFO Write Clock(TFCLK). TFCLK is used to synchronize data transfer transactions from the LINK Layer device to the PHY layer device. TFCLK may cycle at any rate from 25 MHz up to 50 MHz. |

The POS-PHY transmit interface is controlled by the link layer device 12 using the TENB signal. All signals must be updated and sampled using the rising edge of the transmit FIFO clock, TFCLK. The logical timing is valid for both single and multiple physical layer device configurations.

Figure 3:
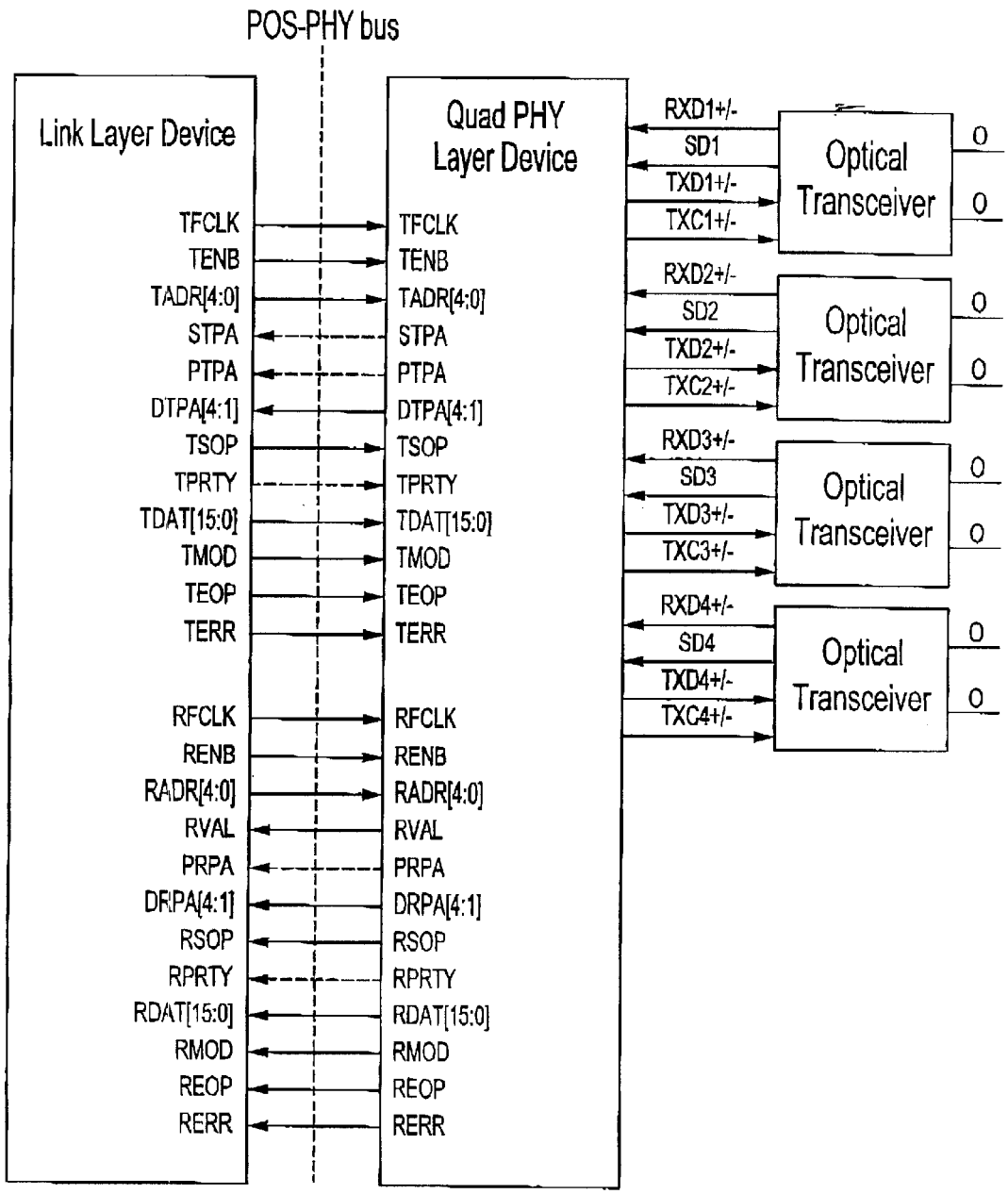
FIG. 3 is a schematic diagram showing the signal connections between multiple physical layer devices and a link layer device.
Figure 5:
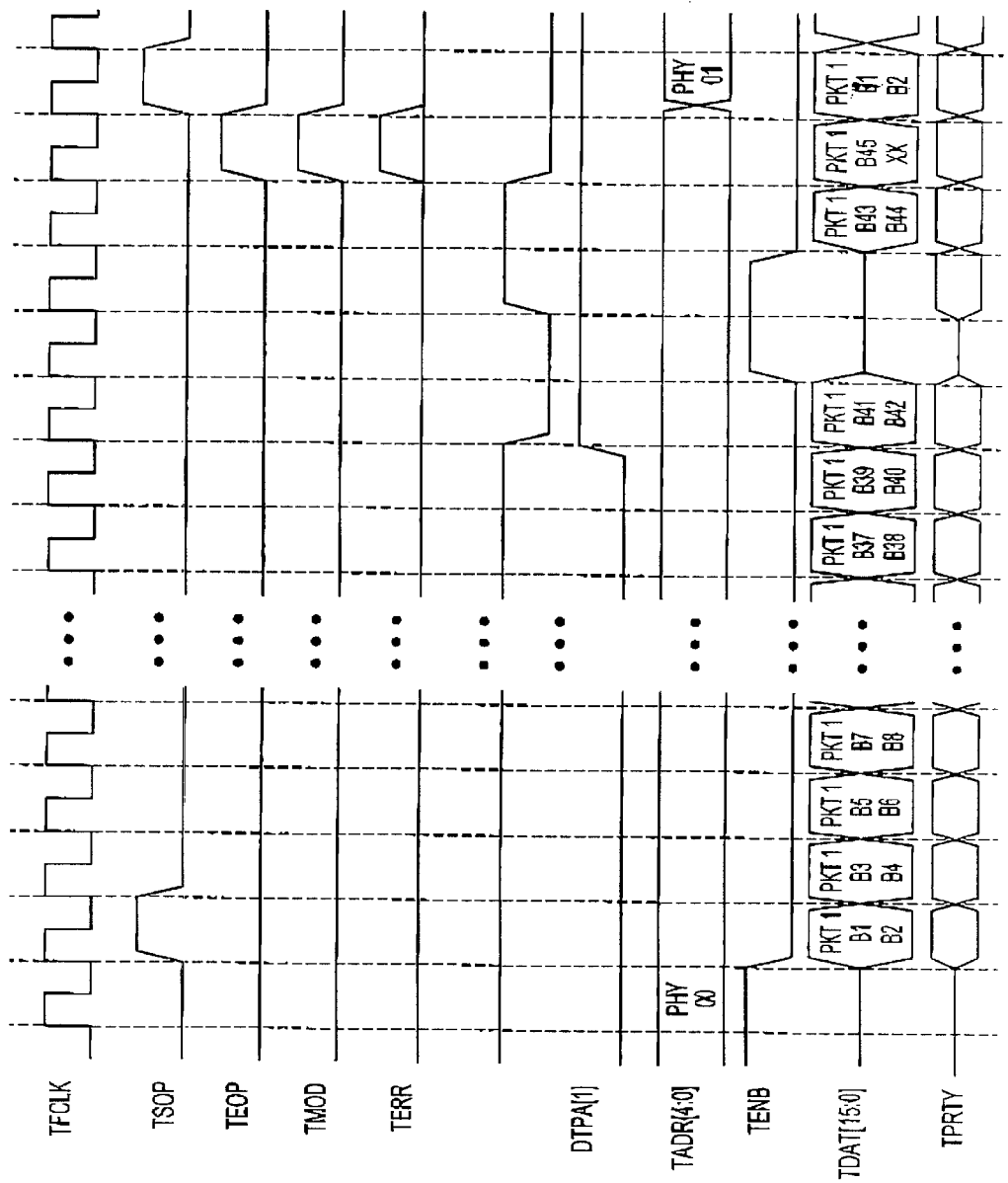
FIG. 5 is a timing diagram showing the transmit logical timing for a single physical layer device and byte level multi-physical layer devices.

Byte level transfer can be used for both single physical layer device (single-PHY) and multiple physical layer device (multi-PHY) applications, as shown in FIG. 3. The physical layer device indicates that the FIFO is not full by asserting the transmit packet available signal, DTPA. DTPA remains asserted until the transmit FIFO is almost full. Almost full implies that the PHY layer device can accept at most a predefined number of writes after the current write.

If DTPA is asserted and the link layer device is ready to write a word, it should assert TENB low and present the word on the TDAT bus. If the presented word is the first word of a packet, the link layer device must also assert signal TSOP. At any time, if the link layer device does not have a word to write, it can deassert TENB.

When DTPA transitions low and it has been sampled, the link layer device can write no more than a predefined number of bytes to the physical layer device 15. In this example the predefined value is one word or two bytes. If the link layer writes more than that predefined number of words and DTPA remains deasserted throughout, the physical layer device will indicate an error condition and ignore additional writes until it asserts DTPA again.

Figure 6:
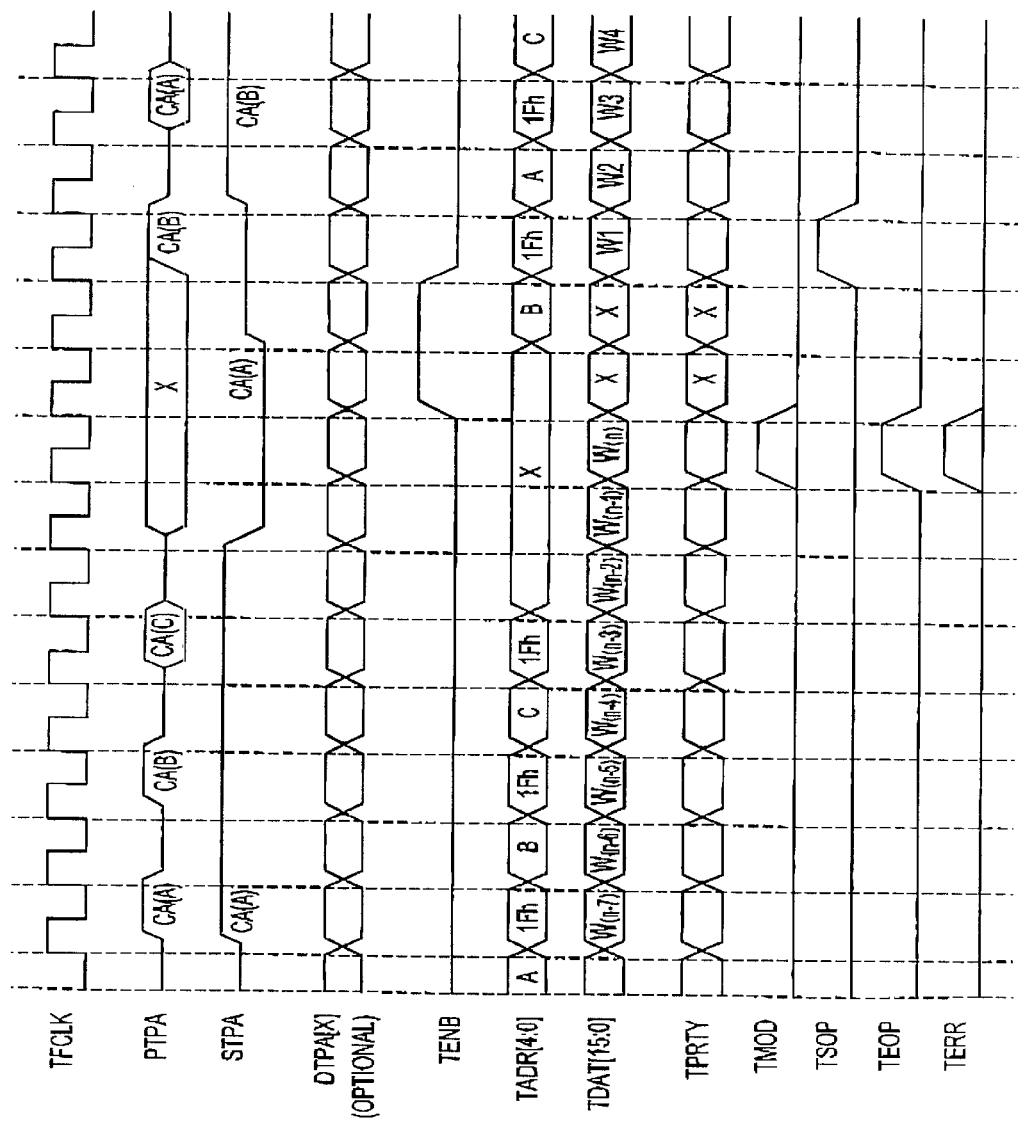
FIG. 6 is a timing diagram showing the transmit logical timing for packet-level multi-physical layer device addressing.
Figure 7:
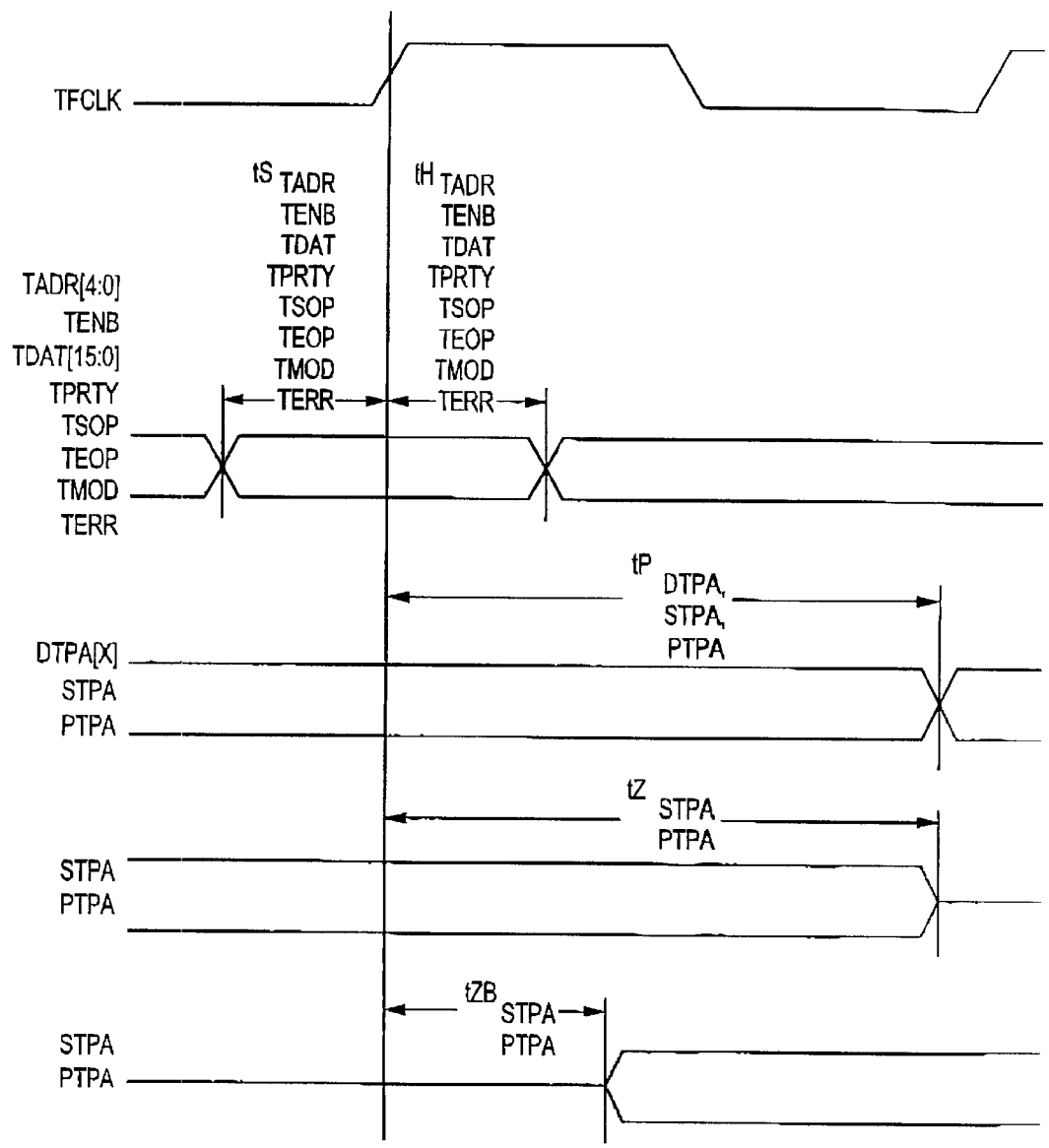
FIG. 7 is a timing diagram showing the transmit physical timing.

Referring to FIG. 6, there is shown a set of transmit logical timing curves for a multi-PHY packet-level transfer, with a polling and a selection sequence. In timing diagram TADR[4:0], "A", "B", and "C" represent any arbitrary address value; the link layer device 12 is not restricted in its polling order. The physical layer device associated with address "A" (PHY "A") indicates it cannot accept data; whereas, the physical layer device associated with address "B" (PHY "B") indicates its willingness to accept data. As a result, the link layer places address "B" on TADR[4:0] the cycle before TENB is asserted to select the PHY "B" as the next packet destination. In this example, the status of the physical layer device associated with address "C:" (PHY "C") is ignored; the link layer device 12 is not constrained to select the latest PHY polled. As soon as the packet transfer is started, the polling process may be recommenced. The STPA signal allows monitoring the selected PHY status and halting data transfer once the FIFO is full. The PTPA signal allows polling other physical layer devices at any time, including while a data transfer is in progress as indicated by TENB asserted. In this example, the physical layer device was configured to deassert STPA two words (4 bytes) before the FIFO is empty. However, the system can be configured differently.

In a physical layer device-link layer device interface all AC timing is from the perspective of the physical layer device. Table 2 shows the transmit interface timing symbols and their corresponding descriptions. The parameters shown apply only if the physical layer device supports address decoding internally. FIG. 6 shows the transmit physical timing diagrams corresponding to the symbols in Table 2. In these diagrams when a set-up time is specified between an input and a clock, the set-up time is the time in nanoseconds from the 1.4 volt point of the input to the 1.4 volt point of the clock. When a hold time is specified between an input and a clock, the hold time is the time in nanoseconds from the 1.4 volt point of the clock to the 1.4 volt point of the input. Output propagation delay time is the time in nanoseconds from the 1.4 volt point of the reference signal to the 1.4 volt point of the output. Maximum output propagation delays are measured with a 30 pF load on the outputs.

TABLE 2

Transmit Interface Timing

| Symbol | Description |
|---|---|
| | TFCLK Frequency |
| | TFCLK Duty Cycle |
| $tS_{TENB}$ | TENB Set-up time to TFCLK |
| $tH_{TENB}$ | TENB Hold time to TFCLK |
| $tS_{TDAT}$ | TDAT[15:0] Set-up time to TFCLK |
| $tH_{TDAT}$ | TDAT[15:0] Hold time to TFCLK |
| $tS_{TPRTY}$ | TPRTY Set-up time to TFCLK |
| $tH_{TPRTY}$ | TPRTY Hold time to TFCLK |
| $tS_{TSOP}$ | TSOP Set-up time to TFCLK |
| $tH_{TSOP}$ | TSOP Hold time to TFCLK |
| $tS_{TEOP}$ | TEOP Set-up time to TFCLK |
| $tH_{TEOP}$ | TEOP Hold time to TFCLK |
| $tS_{TMOD}$ | TMOD Set-up time to TFCLK |
| $tH_{TMOD}$ | TMOD Hold time to TFCLK |
| $tS_{TERR}$ | TERR Set-up time to TFCLK |
| $tH_{TERR}$ | TERR Hold time to TFCLK |
| $tS_{TADR}$ | TADR[4:0] Set-up time to TFCLK |
| $tH_{TADR}$ | TADR[4:0] Hold time to TFCLK |
| $tP_{STPA}$ | TFCLK High to STPA Valid |
| $tZ_{STPA}$ | TFCLK High to STPA Tristate |
| $tZB_{STPA}$ | TFCLK high to STPA Driven |
| $tP_{PTPA}$ | TFCLK high to PTPA Valid |
| $tZ_{PTPA}$ | TFCLK High to PTPA Tristate |
| $tZB_{PTPA}$ | TFCLK High to PTPA Driven |
| $tP_{DTPA}$ | TFCLK High to DTPA[x] Valid |

The standard FIFO depth for POS-PHY interfaces 10 is line rate and application dependent. The transmit buffer shall have a programmable threshold defined in terms of the number of bytes available in the FIFO for the deassertion of the TPA flags. In this way, transmit latency can be managed, and advance TPA look ahead can be achieved. This programmable threshold allows a link layer device 12 to continue to burst data in without overflowing the transmit buffer, after TPA has been deasserted.

In the transmit direction, the physical layer device does not initiate data transmission before a predefined number of bytes or an end of packet flag has been stored in the transmit FIFO. This capability does not affect the POS-PHY bus protocol but is required to avoid transmit FIFO underflow and frequent data retransmission by the higher layers.

Table 3 below lists the receive side POS-PHY specification signals for single-PHY and multi-PHY applications. All signals are expected to be updated and sampled using the rising edge of the receive FIFO clock, RFCLK. A fully compatible POS-PHY physical layer device 15 requires a 256 byte receive FIFO.

TABLE 3

Receive Signal Descriptions

| SIGNAL | DIRECTION | DESCRIPTION |
|---|---|---|
| RDAT[15:0] | PHY TO LINK | Receive Packet Data Bus (RDAT[15:0]). The RDAT[15:0] bus carries the packet octets that are read from the selected receive FIFO. RDAT[15:0] is considered valid only when RENB is simultaneously asserted and a valid PHY layer device has been selected via the RADR[4:0] signals. Data must be received in big endian order. Given the defined data structure, bits are received in the following order: 15, 14 . . . 8, 7, . . . 1, 0. The PHY layer device shall tristate RDAT[15:0] when RENB is high. RDAT[15:0] shall also be tristated when either the null-PHY address (0x1F) or an address not matching the PHY layer device address is presented on the RADR[4:0] signals when RENB is sampled high (has been deasserted during the previous clock cycle). |
| RPRTY | PHY to LINK | Receive Parity (RPRTY) signal. The receive parity (RPRTY) signal indicates the parity of the RDAT bus. When RPRTY is supported, the PHY layer device must support both odd and even parity. The PHY Layer device shall tristate RPRTY when RENB is high. RPRTY shall also be tristated when either the null-PHY address (0x1F) or an address not matching the PHY layer device address is presented on the RADR[4:0] signals when RENB is sampled high (has been deasserted during the previous clock cycle). |
| RMOD | PHY to LINK | The Receive Word Modulo (RMOD) signal. RMOD indicates the size of the current word. RMOD is only used during the last word transfer of a packet, at the same time REOP is asserted. During a packet transfer every word must be complete except the last word which can be composed of 1 or 2 bytes. RMOD set high indicates a 1-byte word (present on MSB's, LSB's are discarded) while RMOD set low indicates a 2-byte word. The PHY Layer device shall tristate RMOD when RENB is high. RMOD shall also be tristated when either the null-PHY address (0x1F) or an address not matching the PHY layer device address is presented on the RADR[4:0] signals when RENB is sampled high (has been deasserted during the previous clock cycle). |
| RSOP | PHY to LINK | Receive Start of Packet (RSOP) signal. RSOP marks the first word of a packet transfer. The PHY layer device must assert RSOP for every packet. The PHY Layer device shall tristate RSOP when RENB is high. RSOP shall also be tristated when either the null-PHY address (0x1F) or an address not matching the PHY layer device address is presented on the RADR[4:0] signals when RENB is sampled high (has been deasserted during the previous clock cycle). |
| REOP | PHY to LINK | The Receive End Of Packet (REOP) signal. REOP marks the end of packet on the RDAT[15:0] bus. During this same cycle RMOD is used to indicate if the last word has 1 or 2 bytes. It is legal to set RSOP high at the same time REOP is high. This provides support for one or two bytes packets, as indicated by the value of RMOD. The PHY Layer device shall tristate REOP when RENB is high. REOP shall also be tristated when either the null-PHY address (0x1F) or an address not matching the PHY layer device address is presented on the RADR[4:0] signals when RENB is sampled high (has been deasserted during the previous clock cycle). |
| RERR | PHY to LINK | The Receive error indicator (RERR) signal. RERR is used to indicate that the current packet is aborted and should be discarded. RERR can only be asserted during the last word transfer of a packet. Conditions that can cause RERR to be set may be, but are not limited to, FIFO overflow, abort sequence detection, FCS error. The PHY Layer device shall tristate RERR when RENB is high. RERR shall also be tristated when either the null-PHY address (0x1F) or an address not matching the PHY layer device address is presented on the RADR[4:0] signals when RENB is sampled high (has been deasserted during the previous clock cycle). |
| RENB | LINK to PHY | Receive multi-PHY Read Enable (RENB) signal. The RENB signal is used to initiate reads from the receive FIFO's. The POS-PHY specification supports both byte-level and packet-level transfer. Packet-level transfer operates with a selection phase when RENB is deasserted and a transfer phase when RENB is asserted. While RENB is asserted, RADR[4:0] is used for polling RPA. Byte level transfer works on a cycle basis. When RENB is asserted data is transferred from the selected PHY and RADR[4:0] is used to select the PHY. Nothing happens when RENB is deasserted. In byte-level transfer mode polling is not possible; packet availability is directly indicated by DRPA[x]. RENB must operate in conjunction with RFCLK to access the FIFO's at a high enough rate to prevent FIFO overflows. |

TABLE 3-continued

Receive Signal Descriptions

| SIGNAL | DIREC-TION | DESCRIPTION |
|---|---|---|
| RADR[4:0] | LINK to PHY | The system may de-assert RENB at anytime it is unable to accept another byte. Receive Read Address (RADR[4:0]) signals. The RADR[4:0] signal is used to select the FIFO (and hence port) that is read from using the RENB signal. For packet-level transfer, RADR[4:0] is also used to determine the FIFO's whose packet available signal is polled on the PRPA output. Address 0x1F is the null-PHY address and shall not be responded to by any PHY layer device. |
| RVAL | PHY to LINK | Receive Data Valid (RVAL) signal. RVAL indicates the validity of the receive data signals. When RVAL is high, the Receive signals (RDAT, RSOP, REOP, RMOD, RXPRTY and RERR) are valid. When RVAL is low, all Receive signals are invalid and must be disregarded. RVAL will transition low on a FIFO empty condition or on an end of packet. No data will be removed from the receive FIFO while RVAL is deasserted. Once deasserted, RVAL will remain deasserted until current PHY has been deselected. RVAL allows to monitor the selected PHY during a data transfer, while monitoring or polling other PHY's is done using PRPA or DRPA[x]. The PHY Layer device shall tristate RVAL when RENB is deasserted. RVAL shall also be tristated when either the null-PHY address (0x1F) or an address not matching the PHY layer device address is presented on the RADR[4:0] signals when RENB is sampled high (has been deasserted during the previous clock cycle). |
| PRPA | PHY to LINK Packet Level Mode Only. | Receive Polled multi-PHY packet Available (PRPA) signal. PRPA indicates when data is available in the polled receive FIFO. When PRPA is high, the receive FIFO has at least one end of packet or a predefined number of bytes to be read (the number of bytes might be user programmable). PRPA is low when the receive FIFO fill level is below the assertion threshold and the FIFO contains no end of packet. PRPA allows to poll every PHY while transferring data from the selected PHY. PRPA is driven by a PHY layer device when its address is polled on RADR[4:0]. A PHY layer device shall tristate PRPA when either the null-PHY address (0x1F) or an address not matching available PHY Layer devices is provided on RADR[4:0]. PRPA is mandatory only if packet-level transfer mode is supported. It shall not be driven in byte-level mode, if available, since the protocol would then not prevent contention. |
| DRPA[x] | PHY to LINK Byte Level Mode Only. | Receive Packet Available (DRPA[x]) Direct Status Indication signals. These signals provide direct status indication for the corresponding port (referred to by the index "x"). DRPA[x] indicates when data is available in the receive FIFO. When DRPA[x] is high, the receive FIFO has at least one end of packet or a predefined number of bytes to be read. The number of bytes is usually user programmable. DRPA[x] is low when the receive FIFO fill level is below the assertion threshold and the FIFO contains no end of packet. DRPA[x] is mandatory only if byte-level transfer mode is supported. It is optional in packet-level mode. |
| RFCLK | LINK to PHY | Receive FIFO Write Clock (RFCLK). RFCLK is used to synchronize data transfer transactions from the LINK layer device to the PHY layer device. RFCLK may cycle at a rate from 25 MHz up to 50 MHz. |

The POS-PHY receive interface is controlled by the link layer device 12 using the RENB signal. All signals must be updated and sampled using the rising edge of the receive FIFO clock, RFCLK. The logical timing is valid for both single and multiple physical layer device operating modes.

In general, the physical layer device 15 indicates that a complete packet or some predefined amount of data is available by asserting the receive packet available signal, PRPA or DRPA[x]. When transferring data, RVAL is asserted and remains high until the internal FIFO of the physical layer device 15 is empty or an end of packet is transferred. Because of the nature of packet transfer, it is not possible to provide a look-ahead capability for RPA or RVAL. A consequence is that the link layer device 12 will sometimes attempt an unsuccessful read cycle while the FIFO is empty or following the transfer of an end of packet signal (REOP). The RVAL signal shall always be used as a data valid indicator. By asserting the RENB signal, the link layer device 12 indicates that the data on the RDAT bus during the next RFCLK cycle will be read from the physical layer device 15.

Figure 8:
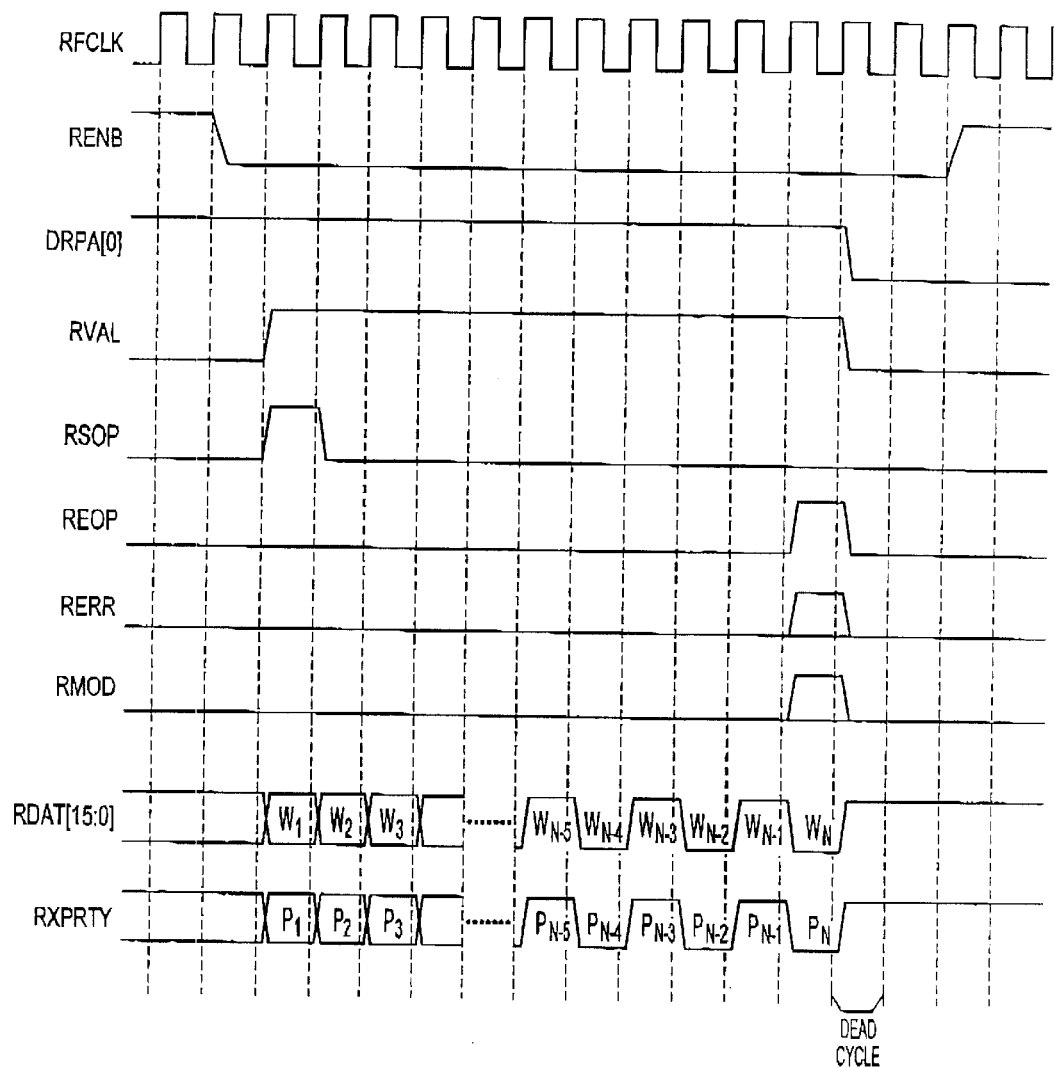
FIG. 8 is a timing diagram showing physical layer device receive logical timing.

FIG. 8 illustrates the single physical layer device operation. The signal DRPA transitions low when the last word of the last packet is available on the RDAT bus. The RDAT bus, RPRTY, RMOD, RSOP, REOP and RERR are valid in cycles for which RVAL is high and RENB was low in the previous cycle. If the link layer device 12 requests a read while RVAL is deasserted, the physical layer device 15 will ignore the additional reads. FIG. 8 identifies a dead cycle which occurs when RVAL transitions low. Since the link layer device 12 is not guaranteed a fixed number of bytes when it starts reading data, it will not in general be able to deassert RENB after the last data word is read. In general, the link layer device 12 will attempt an extra read cycle, for which RVAL will be sampled low, indicating that the data is not valid. After this dead cycle the link layer device 15 should deassert RENB although it is not forced to do so.

Figure 9:
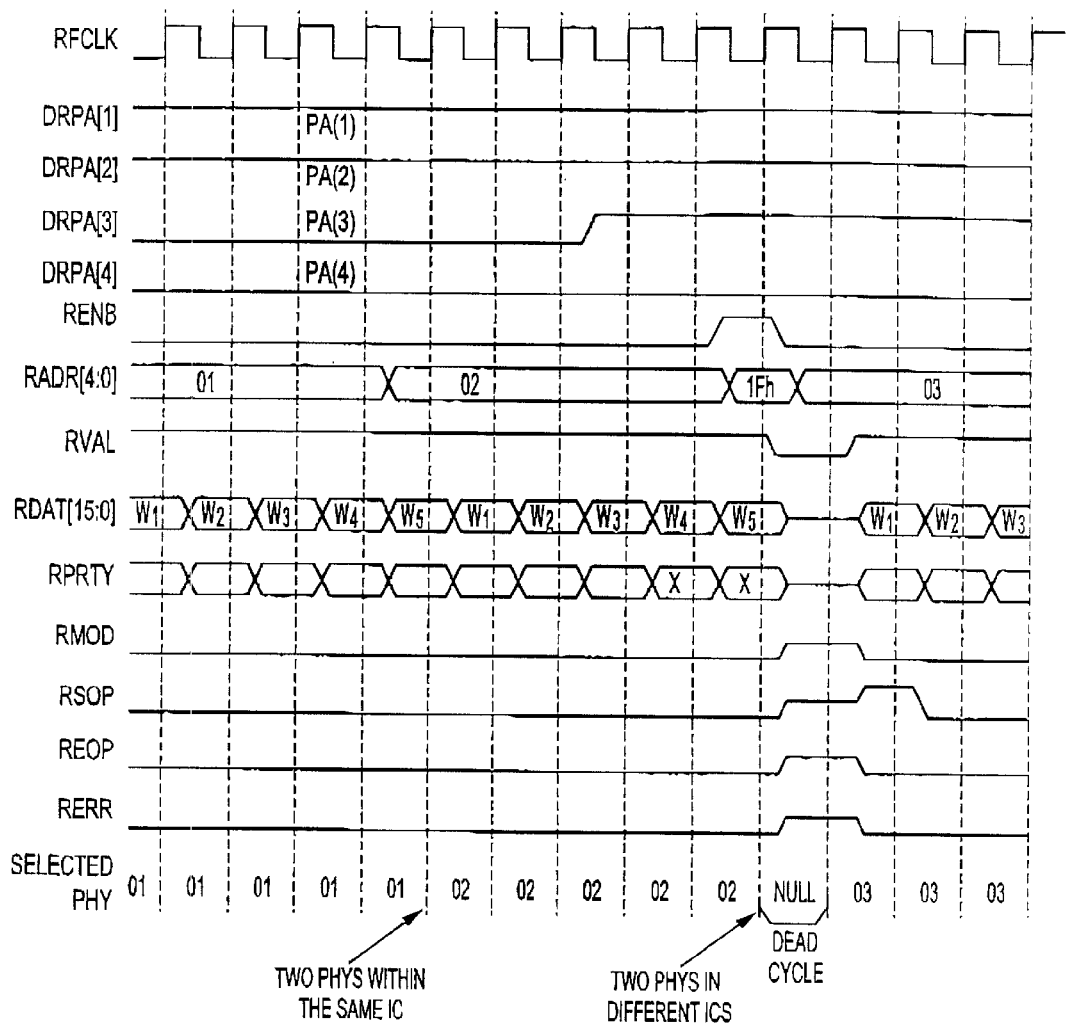
FIG. 9 is a timing diagram showing the logical timing for a byte level multi-physical layer device.

FIG. 9 illustrates the byte-level multi-PHY operation. Independent DRPA[x] provide status indication for every receive FIFO. In this example we assume that the system consists of 4 logical PHY's implemented using two separate integrated circuits (IC's). Physical layer devices labeled "1" and "2" are built within the same IC, as are physical layer devices labeled "3" and "4". The transition between physical layer devices "1" and "2" occurs without any lost bus cycle. It should be noticed that the addition of a dead cycle would be required when the link layer device 12 transitions between physical layer device "2" and "3". This dead cycle is required to avoid contention on the bus when one IC gets tristated and the other IC starts driving. It is left to the system implementers to determine if this dead cycle is required or not. Having this dead cycle built into the protocol would provide a more generic interface, at the expense of one lost clock cycle for every RADR[4:0] change.

Figure 10:
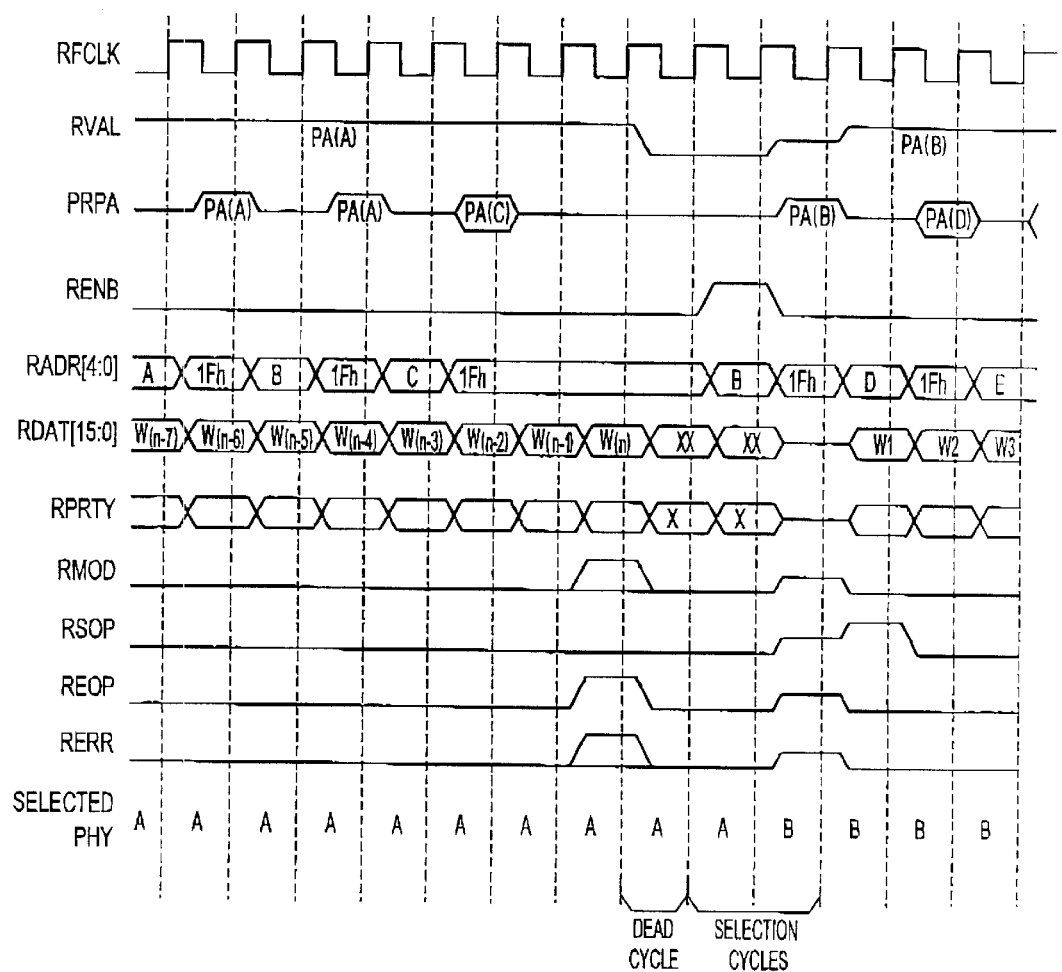
FIG. 10 is a timing diagram showing the logical timing for a packet level multi-physical layer device.

FIG. 10 is an example of a multi-PHY polling and selection sequence. The labels "A", "B", "C", "D" and "E" represent any arbitrary address values; the link layer device is not restricted in its polling order. The physical layer device associated with address "A" indicates it has a packet available; as does the physical layer device associated with address "B". As a result, the link layer places address "B" on RADR[4:0] the cycle before RENB is asserted to select PHY "B" as the next packet source. In this example, the status of PHY "C" is ignored; the link layer device 12 is not constrained to select the latest PHY polled. As soon as the packet transfer is started, the polling process may be recommenced.

During multi-PHY operation several physical layer devices share the RDAT[15:0], RSOP, REOP, RMOD and RPRTY signals. As a result, these signals must be tri-stated in all PHY devices which have not been selected for reading by the link layer device 12. Selection of which PHY layer device is being read is made by the value on RADR[4:0] the cycle before RENB is asserted.

Figure 11:
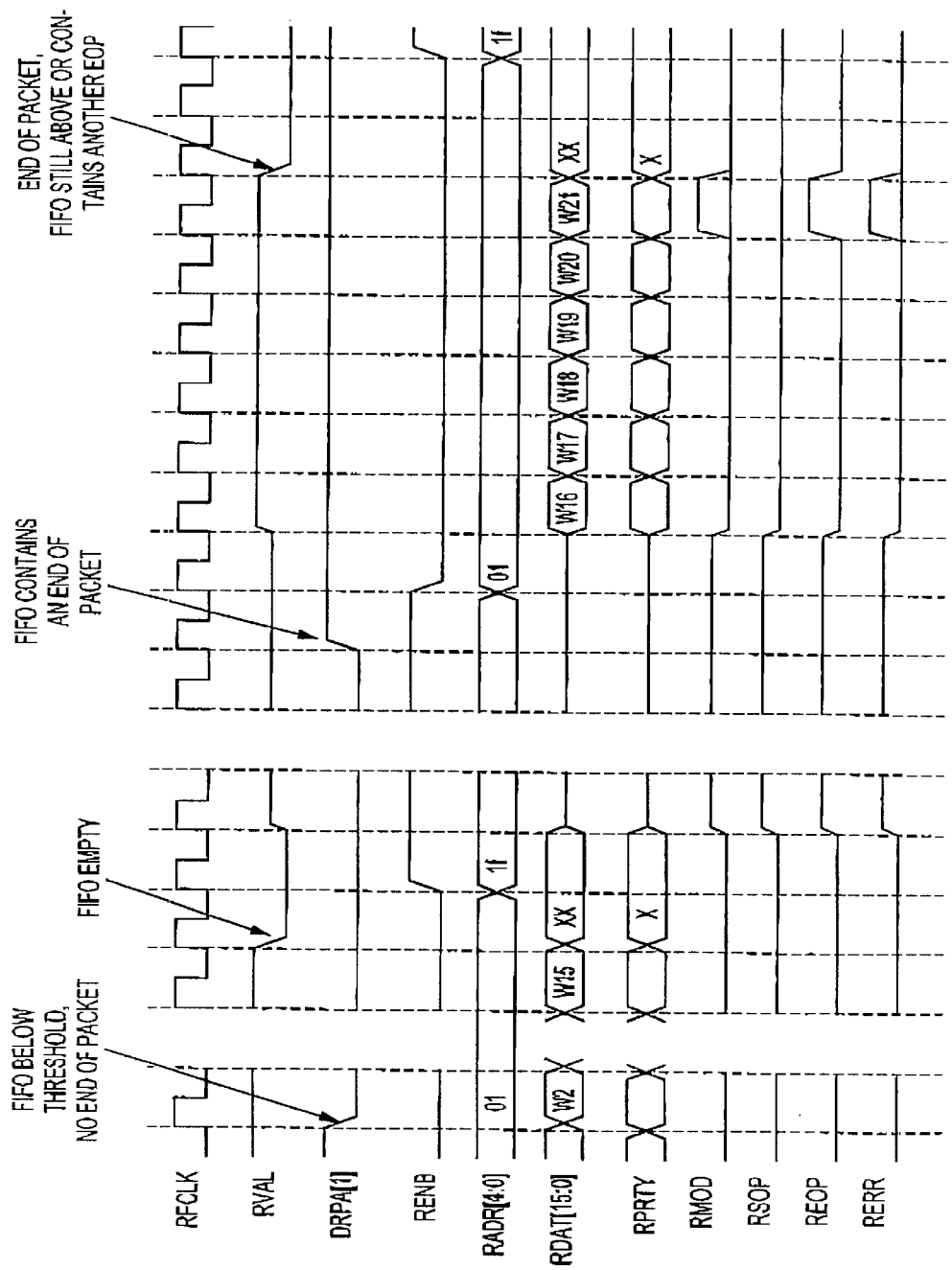
FIG. 11 is a timing diagram showing a byte level illustration of the receive data-valid (RVAL) and the receive packet available (RPA) signals.

FIG. 11 illustrates the difference between RPA and RVAL. This illustration presents two transfers. During the first transfer, DRPA[1] gets deasserted after the FIFO fill level drop below the programmed 16 bytes threshold. However RVAL remains asserted indicating that there is valid data being transferred. Eventually the FIFO runs empty and RVAL is deasserted. The link layer device 12 responds by deasserting RENB and waits until DRPA[1] is reasserted, after which the link layer device 12 starts the second transfer. In this case, the opposite situation occurs. The FIFO still contains data when an end of packet is encountered and RVAL is deasserted. While RVAL is deasserted, the PHY does not transfer any data. At this point, one option would be that the link layer device 12 deasserts RENB and reselects the PHY starting the transfer of a new packet. This example illustrates how RVAL and RPA allow the alignment of data transfers with packet boundaries, at the expense of a few wasted bus cycles.

All AC timing is from the perspective of the physical layer device in a physical layer device to link layer device interface. Table 4 sets out the symbols for the receive interface timing.

TABLE 4

Receive Interface Timing

| Symbol | Description |
|---|---|
|  | RFCLK Frequency |
|  | RFCLK Duty Cycle |
| $tS_{RENB}$ | RENB Set-up time to RFCLK |
| $tH_{RENB}$ | RENB Hold time to RFCLK |
| $tS_{RADR}$ | RADR[4:0] Set-up time to RFCLK |
| $tH_{RADR}$ | RADR[4:0] Hold time to RFCLK |
| $tP_{RDAT}$ | RFCLK High to RDAT Valid |
| $tZ_{RDAT}$ | RFCLK High to RDAT Tristate |
| $tZ_{RDAT}$ | RFCLK High to RDAT Driven |
| $tP_{RPRTY}$ | RFCLK High to RPRTY Valid |
| $tZ_{RPRTY}$ | RFCLK High to RPRTY Tristate |
| $tZB_{RPRTY}$ | RFCLK High to RPRTY Driven |
| $tP_{RSOP}$ | RFCLK High to RSOP Valid |
| $tZ_{RSOP}$ | RFCLK High to RSOP Tristate |
| $tZB_{RSOP}$ | RFCLK High to RSOP Driven |
| $tP_{REOP}$ | RFCLK High to REOP Valid |

TABLE 4-continued

Receive Interface Timing

| Symbol | Description |
|---|---|
| $tZ_{REOP}$ | RFCLK High to REOP Tristate |
| $tZB_{REOP}$ | RFCLK High to REOP Driven |
| $tP_{RMOD}$ | RFCLK High to RMOD Valid |
| $tZ_{RMOD}$ | RFCLK High to RMOD Tristate |
| $tZB_{RMOD}$ | RFCLK High to RMOD Driven |
| $tP_{RERR}$ | RFCLK High to RERR Valid |
| $tZ_{RERR}$ | RFCLK High to RERR Tristate |
| $tZB_{RERR}$ | RFCLK High to RERR Driven |
| $tP_{RVAL}$ | RFCLK High to RVAL Valid |
| $tZ_{RVAL}$ | RFCLK High to RVAL Tristate |
| $tZB_{RVAL}$ | RFCLK High to RVAL Driven |
| $tP_{PRPA}$ | RFCLK High to PRPA Valid |
| $tZ_{PRPA}$ | RFCLK High to PRPA Tristate |
| $tZB_{PRPA}$ | RFCLK High to PRPA Driven |
| $tP_{DRPA}$ | RFCLK High to DRPA[x] Valid |

For receive input/output timing the following notes apply:

1. When a set-up time is specified between an input and a clock, the set-up time is the time in nanoseconds from the 1.4 volt point of the input to the 1.4 volt point of the clock.
2. When a hold time is specified between an input and a clock, the hold time is the time in nanoseconds from the 1.4 volt point of the clock to the 1.4 volt point of the input.
3. Output propagation delay time is the time in nanoseconds from the 1.4 volt point of the reference signal to the 1.4 volt point of the output.
4. Maximum output propagation delays are measured with a 30 pF load on the outputs.

The standard FIFO depth for POS-PHY interfaces is rate and application dependent. The receive buffer shall deassert the RVAL flag once the FIFO is empty or an end of packet is transferred. Due to the variable sized nature of packets, it is not practical to provide a lookahead capability on RPA signals. RPA is deasserted when an end of packet is transferred in order to allow the link layer device 12 to align data transfers with packet boundaries, and thus facilitate buffer management. When the PHY provides a programmable RPA assertion fill level, it will be possible to tune the burst transfer size to specific system characteristics.

In addition the PHY shall assert RPA whenever an end of packet is stored in the receive FIFO. This requirement guarantees that small packets or short packet ends too small to exceed the normal RPA assertion level, will be read from the receive FIFO in a timely manner, providing a better control of the FIFO latency.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

We claim:

1. A bus interface for exchanging packets within a communication system between a single link layer device and a physical layer device, comprising:

(a) a PHY transmit interface on said physical layer device having a PHY transmit FIFO;

(b) a link transmit interface on said link layer device electrically coupled to said PHY transmit interface, said link transmit interface being operative to transmit packets of variable length to said PHY transmit interface;

(c) a byte availability indicator on said PHY transmit interface operative to indicate to said link transmit interface when said PHY transmit FIFO has a pre-established minimum number of bytes available for data to be written into;

(d) a PHY receive interface on said physical layer device;

(e) a link receive interface on said link layer device electrically coupled to said PHY receive interface said link receive interface being operative to receive packets of variable length from said PHY receive interface; and (f) a byte validity indicator on said PHY receive interface operative to indicate to said link receive interface the cessation of transmission of valid data from said PHY receive interface, wherein said link layer device generates clocks to control transmission of data between said physical layer device and said link layer device.

2. The bus interface according to claim 1, wherein said link transmit interface transmits a Transmit Start of Packet (TSOP) signal to said PHY transmit interface to indicate a first word of a packet transfer from link transmit interface to said PHY transmit interface and said PHY receive interface transmits a Receive Start of Packet (RSOP) signal to said link receive interface to indicate a first word of a packet transfer from said PHY receive interface to said link receive interface.

3. The bus interface according to claim 1, wherein said PHY transmit interface transmits to said link layer transmit interface, in response to an address of said physical layer device being polled, a Polled-PHY Transmit Available (PTPA) signal to indicate whether or not a polled PHY transmit FIFO is full, wherein said PHY transmit interface transmits to said link layer transmit interface a Selected-PHY Transmit Available (STPA) signal to indicate whether or not a selected PHY transmit FIFO is full and wherein said PHY receive interface transmits to said link layer receive interface, in response to an address of said PHY layer device being polled, a Receive Polled multi-PHY packet Available (PRPA) signal to indicate when data is available in the polled PHY transmit FIFO.

4. The bus interface according to claim 1, wherein said byte validity indicator is a Receive Data Valid (RVAL) a signal transmitted from said PHY receive interface to said link layer receive interface to align data transfers with packet boundaries and to indicate a PHY Receive Interface FIFO empty condition.

5. The bus interface according to claim 1, wherein said byte availability indicator is a Selected-PHY Transmit Packet Available (STPA) signal transmitted from said PHY transmit interface to said link transmit interface to indicate whether or not the transmit FIFO is not full.

6. The bus interface according to claim 1, wherein data transfer is reversibly convertible from a packet level mode to a byte level mode.

7. The bus interface according to claim 1, wherein the number of bytes in each word is two.

8. A bus interface for exchanging packets within a communication system between a single link layer device and a plurality of physical layer devices, comprising:

(a) a plurality of PHY transmit interfaces, one on each of said physical layer devices, each PHY transmit interface having a PHY transmit FIFO;

(b) a link transmit interface on said link layer device electrically coupled to each of said PHY transmit interfaces, said link transmit interface being operative to transmit packets of variable length to said each PHY transmit interface;

(c) an availability indicator on said each PHY transmit interface operative to indicate to said link transmit interface when a PHY transmit FIFO on said each PHY transmit interface has a pre-established minimum number of bytes available for data to be written into;

(d) a plurality of PHY receive interfaces, one on each of said physical layer devices;

(e) a link receive interface on said link layer device electrically coupled to each of said plurality of PHY receive interfaces said link receive interface operative to receive packets of variable length from said PHY receive interfaces;

(f) a byte validity indicator on said each of said plurality of PHY receive interfaces operative to indicate to said link receive interface the cessation of transmission of valid data from said each PHY receive interface, wherein said link layer device generates clocks to control transmission of data to and from said physical layer devices.

9. A bus interface according to claim 8, wherein said link transmit interface transmits a Transmit Start of Packet (TSOP) signal to a selected one of said PHY transmit interfaces to indicate a first word of a packet transfer from link transmit interface to said selected PHY transmit interface and said selected PHY receive interface transmit a Receive Start of Packet (RSOP) signal to said link receive interface to indicate a first word of a packet transfer from said selected PHY receive interface to said link receive interface.

10. A bus interface according to claim 8, wherein a selected one of said PHY transmit interfaces transmits to said link layer transmit interface, in response to an address of a corresponding physical layer device being polled, a Polled-PHY Transmit Available (PTPA) signal to indicate whether or not a PHY transmit FIFO of said corresponding physical layer device is full, wherein said selected PHY transmit interface transmits to said link layer transmit interface a Selected-PHY Transmit Available (STPA) signal to indicate whether or not a PHY transmit FIFO of said selected one of said PHY transmit interfaces is full and wherein a selected one of said PHY receive interfaces transmits to said link layer receive interface, in response to an address of a corresponding physical layer device being polled, a Receive Polled multi-PHY Packet Available (PRPA) signal to indicate when data is available in said polled PHY transmit FIFO.

11. A bus interface according to claim 8, wherein data transfer is reversibly convertible from a packet level mode to a byte level mode.

12. A method of exchanging variable length packets across a bus interface of a communication system between a single data link layer device having a link transmit interface and a link receive interface and a physical layer device having a PHY transmit interface and PHY transmit FIFO and a PHY receive interface, comprising:

(a) transmitting a Transmit Start of Packet (TSOP) signal from said link layer device to said physical layer device to indicate a first word of a packet to be transferred from said link layer device to said physical layer device;

(b) indicating to said link transmit interface when said PHY transmit FIFO has a pre-established minimum number of bytes available for data to be written into;

(c) transmitting a Transmit End of Packet (TEOP) signal from said link layer device to said physical layer device to indicate an end of a packet being transferred from said link layer device to said physical layer device;

(d) transmitting a Receive Start of Packet (RSOP) signal from said physical layer device to said link layer device to indicate a first word of a packet being transferred from said physical layer device to said link layer device;

(e) indicating cessation of transmission of valid data from said PHY receive interface to said link receive interface; and (f) transmitting a Receive End of Packet (REOP) signal from said physical layer device to said link layer device to indicate the end of a packet being transferred from said physical layer device to said link layer device, wherein said link layer device generates clocks to control transmission of data to and from said Physical layer device.

13. A method according to claim 12, wherein step (e) includes transmitting a Receive Data Valid (RVAL) signal from said physical layer device to said link layer device to align data transfers with packet boundaries and to indicate a PHY Receive Interface FIFO empty condition.

14. A method according to claim 12, wherein step (b) includes transmitting a Selected-PHY transmit Packet Available (STPA) signal to indicate whether or not a selected transmit FIFO is not full.

15. A method of exchanging variable length packets across a bus interface of a communication system between a single data link layer device having a link transmit interface and a link receive interface and a plurality of physical layer devices each having a PHY transmit interface and PHY transmit FIFO and a PHY receive interface, comprising:

(a) transmitting a Transmit Start of Packet (TSOP) signal from said link layer device to a selected one of said physical layer devices to indicate a first word of a packet to be transferred from said link layer device to said selected physical layer device;

(b) indicating to said link transmit interface when a PHY transmit FIFO of said selected physical layer device has a pre-established minimum number of bytes available for data to be written into;

(c) transmitting a Transmit End of Packet (TEOP) signal from said link layer device to said selected physical layer device to indicate an end of a packet being transferred from said link layer device to said selected physical layer device;

(d) transmitting a Receive Start of Packet (RSOP) signal from a transmitting one of said plurality of physical layer devices to said link layer device to indicate a first word of a packet being transferred from said transmitting one of said physical layer devices to said link layer device;

(e) indicating cessation of transmission of valid data from a PHY receive interface of the transmitting physical layer device to said link receive interface; and (f) transmitting a Receive End of Packet (REOP) signal from said transmitting physical layer device to said link layer device to indicate the end of a packet being transferred from said transmitting physical layer device to said link layer device, wherein said link layer device generates clocks to control transmission of data to and from said physical layer devices.

16. A method according to claim 15, wherein step (e) includes transmitting a Receive Data Valid (RVAL) signal from said physical layer device to said link layer device to align data transfers with packet boundaries and to indicate a PHY Receive Interface FIFO empty condition.

17. A method according to claim 15, wherein step (b) includes transmitting a Selected-PHY transmit Packet Available (STPA) signal to indicate whether or not a selected transmit FIFO is not full.

* * * * *

UNITED STATES PATENT AND TRADEMARK OFFICE
CERTIFICATE OF CORRECTION

Figure 12:
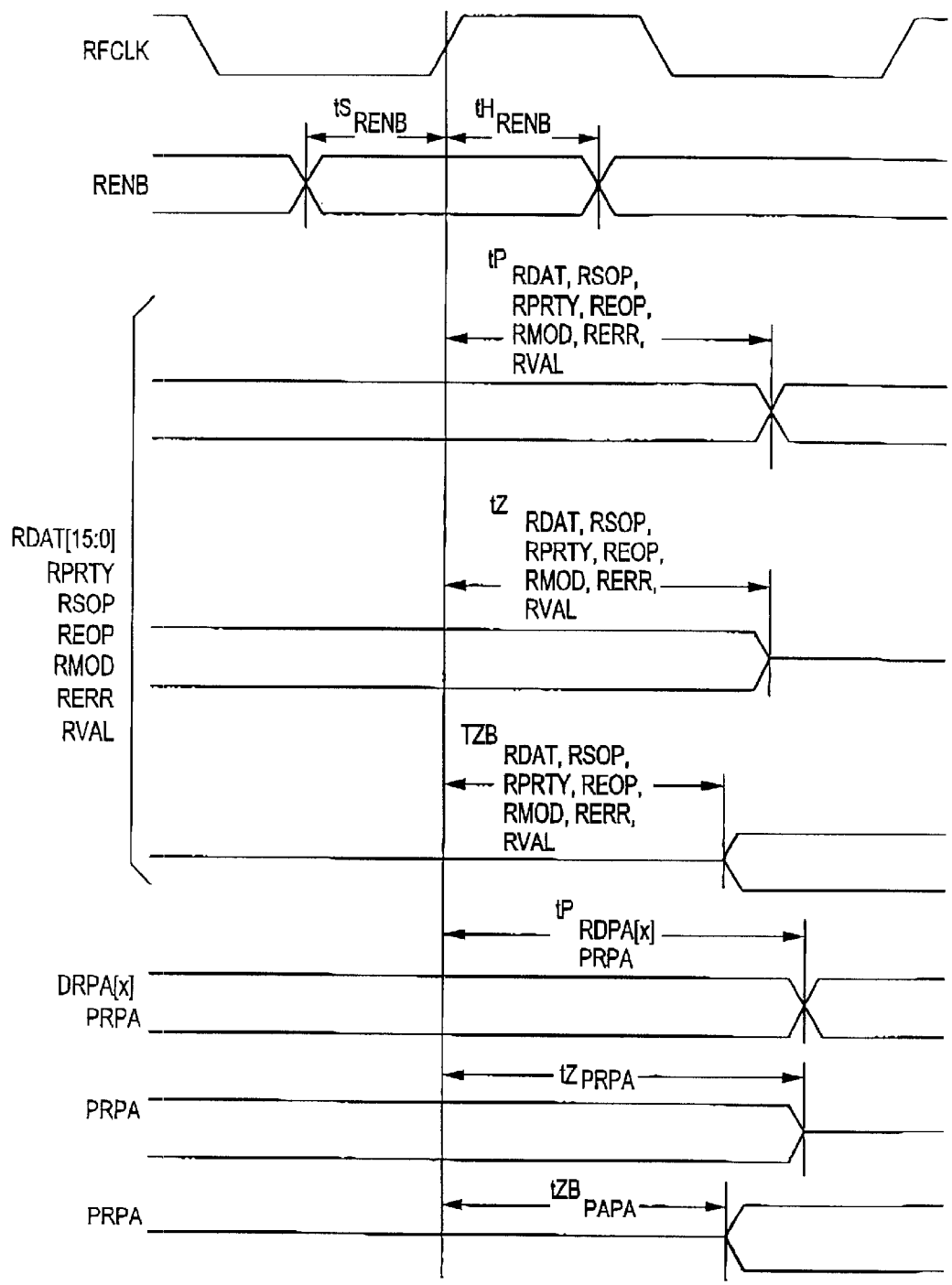
FIG. 12 is a timing diagram showing the receive physical timing.

PATENT NO. : 6,850,523 B1
DATED : February 1, 2005
INVENTOR(S) : Travis James Karr and Martin Chalifoux It is certified that error appears in the above-identified patent and that said Letters Patent is hereby corrected as shown below:

Drawings,
Figure 4, delete "Byte 16" and insert -- XX --.
Figure 10, delete "PA(A)" and insert -- PA(B) --.
Figure 12, delete "RDPA[x]" and insert -- DRPA[x] --; delete "PAPA" and insert -- PRPA --.

Column 2,
Line 29, delete "pith" and insert -- with --.

Column 3,
Line 2, delete "the".

Column 9,
Line 4, delete "look ahead" and insert -- lookahead --.
Line 36, delete "15, 14...8, 7,...1, 0." and insert -- 15, 14...8, 7, 6...1, 0. --.

Column 15,
Line 45, delete "a" after "(RVAL)".

Column 17,
Line 19, delete "Physical" and insert -- physical --.

Signed and Sealed this

Thirteenth Day of December, 2005

JON W. DUDAS
*Director of the United States Patent and Trademark Office*